(12) United States Patent
Marchionna et al.

(10) Patent No.: US 9,598,652 B2
(45) Date of Patent: Mar. 21, 2017

(54) PROCESS FOR THE CONVERSION OF HEAVY CHARGES SUCH AS HEAVY CRUDE OILS AND DISTILLATION RESIDUES

(71) Applicant: ENI S.p.A., Rome (IT)

(72) Inventors: Mario Marchionna, Milan (IT); Alberto Delbianco, Robecco sul Naviglio (IT); Nicoletta Panariti, Lecco (IT); Romolo Montanari, San Donato Milanese (IT); Sergio Rosi, San Donato Milanese (IT); Sebastiano Correra, San Donata Milanese (IT)

(73) Assignee: ENI S.p.A., Rome (IT)

( * ) Notice: Subject to any disclaimer, the term of this patent is extended or adjusted under 35 U.S.C. 154(b) by 312 days.

(21) Appl. No.: 14/083,237

(22) Filed: Nov. 18, 2013

(65) Prior Publication Data

US 2014/0197070 A1    Jul. 17, 2014

Related U.S. Application Data

(63) Continuation of application No. 13/773,292, filed on Feb. 21, 2013, now abandoned, which is a continuation of application No. 13/532,004, filed on Jun. 25, 2012, now abandoned, which is a continuation of application No. 13/169,950, filed on Jun. 27, 2011, now abandoned, which is a continuation of application No. 12/725,915, filed on
(Continued)

(30) Foreign Application Priority Data

Jul. 6, 2001 (IT) ............... MI2001A1438

(51) Int. Cl.
C10G 67/00 (2006.01)
C10G 67/04 (2006.01)

(52) U.S. Cl.
CPC ......... *C10G 67/0454* (2013.01); *C10G 67/00* (2013.01); *C10G 2300/107* (2013.01); *C10G 2300/1033* (2013.01); *C10G 2300/1077* (2013.01); *C10G 2300/205* (2013.01); *C10G 2300/206* (2013.01); *C10G 2300/207* (2013.01); *C10G 2300/4081* (2013.01); *C10G 2300/44* (2013.01); *Y02P 30/20* (2015.11)

(58) Field of Classification Search
None
See application file for complete search history.

(56) References Cited

U.S. PATENT DOCUMENTS 2,559,285 A   7/1951 Douce
3,723,294 A   3/1973 Gatsis et al.
(Continued)

FOREIGN PATENT DOCUMENTS

WO        01/60952        8/2001

OTHER PUBLICATIONS

U.S. Appl. No. 14/332,663, filed Jul. 16, 2014, Montanari, et al.

*Primary Examiner* — Tam M Nguyen
(74) *Attorney, Agent, or Firm* — Oblon, McClelland, Maier & Neustadt, L.L.P.

(57) ABSTRACT

A process for converting a heavy charge such as a heavy crude oil, a tar from oil sand and a distillation residue, by combining a hydroconversion with catalysts in slurry phase process, a distillation or flash process, and a deasphalting process, wherein the three processes operate on mixed streams consisting of fresh charge and recycled streams.

21 Claims, 2 Drawing Sheets

Related U.S. Application Data

Mar. 17, 2010, now abandoned, which is a continuation of application No. 12/248,163, filed on Oct. 9, 2008, now abandoned, which is a continuation of application No. 11/404,746, filed on Apr. 17, 2006, now abandoned, which is a continuation of application No. 10/188,785, filed on Jul. 5, 2002, now abandoned.

(56) References Cited

U.S. PATENT DOCUMENTS

| | | |
|---|---|---|
| 4,062,758 A | 12/1977 | Goudriaan et al. |
| 4,126,538 A | 11/1978 | Goudriaan et al. |
| 5,134,019 A | 7/1992 | Shiokawa et al. |
| 5,179,388 A | 1/1993 | Shiokawa et al. |
| 5,183,697 A | 2/1993 | Ide et al. |
| 5,238,726 A | 8/1993 | Ide et al. |
| 5,242,578 A | 9/1993 | Taylor et al. |
| 5,324,585 A | 6/1994 | Akiyama et al. |
| 5,328,747 A | 7/1994 | Ide et al. |
| 5,336,548 A | 8/1994 | Shiokawa et al. |
| 5,409,758 A | 4/1995 | Hiyoshi et al. |
| 5,428,372 A | 6/1995 | Akiyama et al. |
| 5,482,911 A | 1/1996 | Hiroishi et al. |
| 5,773,153 A | 6/1998 | Shiokawa et al. |
| 5,800,914 A | 9/1998 | Shiokawa et al. |
| 5,932,090 A | 8/1999 | Marchionna et al. |
| 5,952,103 A | 9/1999 | Shiokawa et al. |
| 7,691,256 B2 | 4/2010 | Montanari et al. |
| 8,017,000 B2 | 9/2011 | Montanari et al. |
| 2002/0005374 A1 | 1/2002 | Roby, Jr. et al. |
| 2006/0157385 A1 | 7/2006 | Montanari et al. |
| 2006/0163115 A1 | 7/2006 | Montanari et al. |
| 2006/0175229 A1 | 8/2006 | Montanari et al. |
| 2006/0272982 A1 | 12/2006 | Montanari et al. |
| 2009/0261016 A1 | 10/2009 | Marchionna et al. |
| 2009/0314681 A1 | 12/2009 | Marchionna et al. |

Variation of the k parameter in relation to the composition of the mixture.

PROCESS FOR THE CONVERSION OF HEAVY CHARGES SUCH AS HEAVY CRUDE OILS AND DISTILLATION RESIDUES

The present application is a continuation application of Ser. No. 13/773,292, now abandoned, which is a continuation application of Ser. No. 13/532,004, now abandoned, which is a continuation application of Ser. No. 13/169,950, now abandoned, which is a continuation application of Ser. No. 12/725,915, now abandoned, which is a continuation application of Ser. No. 12/248,163, now abandoned, which is a continuation application of U.S. Ser. No. 11/404,746, now abandoned, which is a Continuation application of U.S. Ser. No. 10/188,785, abandoned, which claims priority to MI 2001A001438, filed on Jul. 6, 2001.

The present invention relates to a process for the conversion of heavy charges, among which heavy crude oils, tars from oil sands and distillation residues, by the use of three process units: hydroconversion of the charge using catalysts in dispersed phase, distillation and deasphalting, suitably connected and fed with mixed streams consisting of fresh charge and conversion products.

The conversion of heavy crude oils, tars from oil sands and oil residues in liquid products can be substantially effected in two ways: one exclusively thermal, the other by means of hydrogenating treatment.

Current studies are mainly directed towards hydrogenating treatment, as thermal processes have problems linked to the disposal of the by-products, in particular coke (even obtained in quantities higher than 30% by weight with respect to the charge) and to the poor quality of the conversion products.

Hydrogenating processes consist in treating the charge in the presence of hydrogen and suitable catalysts.

Hydroconversion technologies currently on the market use fixed bed or ebullated bed reactors and catalysts generally consisting of one or more transition metals (Mo, W, Ni, Co, etc.) supported on silica/alumina (or equivalent material).

Fixed bed technologies have considerable problems in treating particularly heavy charges containing high percentages of heteroatoms, metals and asphaltenes, as this pollutants cause a rapid deactivation of the catalyst.

Ebullated bed technologies have been developed and commercialized for treating these charges, which provide interesting performances, but are complex and costly.

Hydro-treatment technologies operating with catalysts in dispersed phase can provide an attractive solution to the drawbacks met in the use of fixed or ebullated bed technologies. Slurry processes, in fact, combine the advantage of a wide flexibility of the charge with high performances in terms of conversion and upgrading, and are therefore, in principle, simpler from a technological point of view.

Slurry technologies are characterized by the presence of particles of catalyst having very small average dimensions and effectively dispersed in the medium: for this reason hydrogenation processes are easier and more immediate in all points of the reactor. The formation of coke is considerably reduced and the upgrading of the charge is high.

The catalyst can be charged as powder with sufficiently reduced dimensions (U.S. Pat. No. 4,303,634) or as oil-soluble precursor (U.S. Pat. No. 5,288,681). In this latter case, the active form of the catalyst (generally the metal sulfide) is formed in-situ by thermal decomposition of the compound used, during the reaction itself or after suitable pretreatment (U.S. Pat. No. 4,470,295).

The metallic constituents of the dispersed catalysts are generally one or more transition metals (preferably Mo, W, Ni, Co or Ru). Molybdenum and tungsten have much more satisfactory performances than nickel, cobalt or ruthenium and even more than vanadium and iron (N. Panariti et al., Appl. Catal. A: January 2000, 204, 203).

Although the use of dispersed catalysts solves most of the problems mentioned for the technologies described above, there are disadvantages, however, mainly associated with the life cycle of the catalyst itself and with the quality of the products obtained.

The procedure for the use of these catalysts (type of precursors, concentration, etc.) is in fact extremely important from an economic point of view and also with respect to environmental impact.

The catalyst can be used at a low concentration (a few hundreds of ppm) in a "once-through" configuration, but in this case the upgrading of the reaction products is generally insufficient (N. Panariti et al., Appl. Catal. A: January 2000, 204, 203 and 215). When operating with extremely active catalysts (for example molybdenum) and with higher concentrations of catalyst (thousands of ppm of metal), the quality of the product obtained becomes much better, but the catalyst must be recycled.

The catalyst leaving the reactor can be recovered by separation from the product obtained from hydro-treatment (preferably from the bottom of the distillation column, downstream of the reactor) using conventional methods such as, for example, decanting, centrifugation or filtration (U.S. Pat. No. 3,240,718; U.S. Pat. No. 4,762,812). Part of the catalyst can be recycled to the hydrogenation process without further treatment. However, the catalyst recovered using known hydro-treatment processes, normally has a reduced activity with respect to fresh catalyst and a suitable regeneration step must therefore be effected to restore the catalytic activity and recycle at least part of the catalyst to the hydro-treatment reactor. These recovery procedures of the catalyst, furthermore, are costly and extremely complex from a technological point of view.

With respect to the chemical description of conversion processes, it is convenient to introduce the stability concept which, for a crude oil or oil residue, expresses their tendency to precipitate the asphaltene component due to a change in the operating conditions or chemical composition of the oil and/or asphaltenes (incompatibility) following dilution with hydrocarbon cuts or chemical re-arrangement induced by cracking processes, hydrogenations, etc.

Hydrocarbons which can be precipitated by a crude oil or oil residue by treatment with n-heptane under standard conditions established by regulation IP-143, are conventionally defined as asphaltenes.

From a qualitative point of view, it can be affirmed that incompatibility phenomena arise when products with very different characteristics are mixed with each other, with respect to the nature of the maltene, or non-asphaltene component, as in the case of the mixing of paraffinic crude oils with aromatic crude oils or the dilution of oil residues with cutter stocks of a paraffinic nature (a typical case is the flushing of tar from visbreaking with scarcely aromatic gas oils).

In conversion processes of oil residues, tars from oil sands and heavy crude oils to distillates, the maximum conversion level is limited by the stability of the residue produced. These processes, in fact, modify the chemical nature of oil and asphaltenes causing a progressive decrease in the stability with an increase in the degree of severity. Over a certain limit, the asphaltenes present in the charge can cause a phase separation (or precipitate) and therefore activate coke formation processes.

From a physico-chemical point of view, the phase separation phenomenon can be explained by the fact that as the conversion reactions proceed, the asphaltene phase becomes more and more aromatic due to dealkylation and condensation reactions.

Consequently, over a certain limit, the asphaltenes are no longer soluble in the maltene phase also because, in the meantime, the latter has become more "paraffinic".

The stability loss control of a heavy charge during a thermal and/or catalytic conversion process is therefore fundamental for obtaining the maximum conversion degree without running into problems relating to the formation of coke and fouling.

In once-through processes, the optimum operating conditions (mainly reaction temperature and residence time) are simply determined on the basis of the stability data of the reactor effluent by means of direct measurements on the non-converted residue (P value, Hot Filtration Test, Spot Test, etc.).

All these processes allow more or less high conversion levels to be reached depending on the charge and type of technology used, generating however a non-converted residue at the stability limit, which we will call tar, which, depending on the specific cases, can vary from 30 to 85% of the initial charge. This product is used for producing fuel oil, tars or it can be used as charge in gasification processes.

In order to increase the overall conversion degree of residue cracking processes, schemes have been proposed which comprise the recycling of more or less significant quantities of tar to the cracking unit. In the case of hydroconversion processes with catalysts dispersed in slurry phase, the recycling of the tar also allows recovery of the catalyst, and for this reason, the same applicants have described in patent application IT-95A001095, a process which enables recycling of the recovered catalyst to the hydro-treatment reactor without the need for a further regeneration step, at the same time obtaining a high-quality product without the production of residue ("zero residue refinery").

This process comprises the following steps:
mixing the heavy crude oil or distillation residue with a suitable hydrogenation catalyst and sending the mixture obtained to a hydro-treatment reactor into which hydrogen or a mixture of hydrogen and $H_2S$ is charged;
sending the stream containing the hydro-treatment reaction product and the catalyst in dispersed phase to a distillation zone in which the most volatile fractions are separated;
sending the high-boiling fraction obtained in the distillation step to a deasphalting step, and the consequent production of two streams, one consisting of deasphalted oil (DAO), the other consisting of asphalt, catalyst in dispersed phase and possibly coke and enriched with metals coming from the initial charge;
recycling at least 60%, preferably at least 80%, of the stream consisting of asphalt, catalyst in dispersed phase and possibly coke, rich in metals, to the hydro-treatment zone.

It has now been found that in the case of the upgrading of heavy crude oils or tars from oil sands to complex hydrocarbon mixtures to be used as raw material for further conversion processes to distillates, it may be convenient to use different process configurations with respect to that described above, whereby the following advantages are obtained:
maximization of conversion yields to distillable products (deriving from both atmospheric and vacuum distillation), and to deasphalted oil (DAO), which in most cases may exceed 95%;
maximization of the upgrading degree of the charge, i.e. of the removal of the poisons present (metals, sulfur, nitrogen, carbonaceous residue), minimizing the production of coke;
maximum flexibility in treating charges differing in the nature of the hydrocarbon component (density) and level of pollutants present;
possibility of completely recycling the hydrogenation catalyst without the need for regeneration.

DETAILED DESCRIPTION OF THE INVENTION

Figure 1:
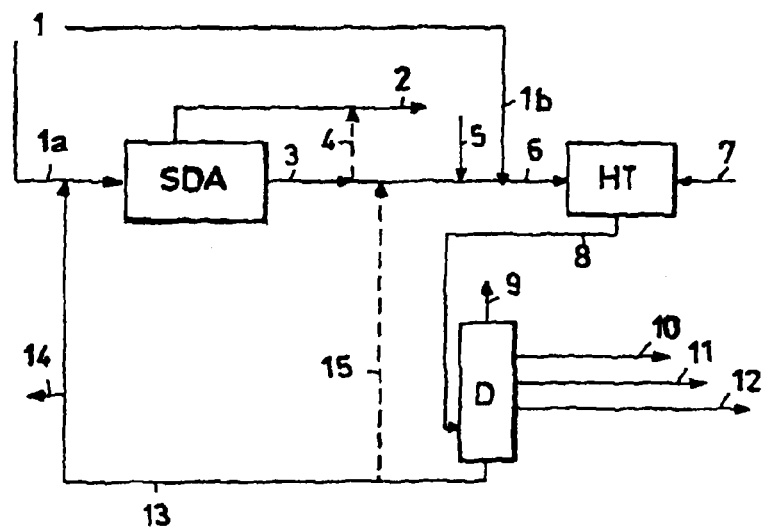
FIG. 1 shows an embodiment of the invention including deasphalting.

The process, object of the present invention, for the conversion of heavy charges by means of the combined use of the following three process units: hydroconversion with catalysts in slurry phase (HT), distillation or flash (D), deasphalting (SDA), is characterized in that the three units operate on mixed streams consisting of fresh charge and recycled streams, using the following steps:
sending at least one fraction of the heavy charge to a deasphalting section (SDA) in the presence of solvents obtaining two streams, one consisting of deasphalted oil (DAO), the other of asphalts;
mixing the asphalt with a suitable hydrogenation catalyst and optionally with the remaining fraction of heavy charge not sent to the deasphalting section and sending the mixture obtained to a hydro-treatment reactor (HT) into which hydrogen or a mixture of hydrogen and $H_2S$ is charged;
sending the stream containing the hydro-treatment reaction product and the catalyst in dispersed phase to one or more distillation or flash steps (D) whereby the most volatile fractions are separated, among which the gases produced in the hydro-treatment reaction;
recycling at least 60% by weight, preferably at least 80%, more preferably at least 95%, of the distillation residue (tar) or liquid leaving the flash unit, containing the catalyst in dispersed phase, rich in metallic sulfides produced by demetallation of the charge and possibly coke, to the deasphalting zone.

The heavy charges treated can be of different kinds: they can be selected from heavy crude oils, distillation residues, heavy oils coming from catalytic treatment, for example heavy cycle oils from catalytic cracking treatment, thermal tars (coming for example from visbreaking or similar thermal processes), tars from oil sands, various kinds of coals and any other high-boiling charge of a hydrocarbon origin generally known in the art as "black oils".

The possible remaining part of the distillation residue (tar) or liquid leaving the flash unit, not recycled to the deasphalting zone, can be either totally or partially recycled, to the hydro-treatment section.

The catalysts can be selected from those obtained from easily decomposable oil-soluble precursors (metallic naphthenates, metallic derivatives of phosphonic acids, metal-carbonyls, etc.) or from preformed compounds based on one or more transition metals such as Ni, Co, Ru, W and Mo: the latter is preferred due to its high catalytic activity.

The concentration of catalyst, defined on the basis of the concentration of metal or metals present in the hydroconversion reactor, ranges from 350 to 10000 ppm, preferably from 1000 to 8000 ppm, more preferably from 1500 to 5000 ppm.

The hydro-treatment step is preferably carried out at a temperature ranging from 370 to 480° C., preferably from 380 to 440° C., and at a pressure ranging from 3 to 30 MPa, preferably from 10 to 20 MPa.

The hydrogen is fed to the reactor, which can operate either under down-flow or, preferably up-flow conditions. The gas can be fed to different sections of the reactor.

The distillation step is preferably carried out at reduced pressure, at a pressure ranging from 0.001 to 0.5 MPa, preferably from 0.05 to 0.3 MPa.

The hydro-treatment step can consist of one or more reactors operating within the range of conditions indicated above. Part of the distillates produced in the first reactor can be recycled to the subsequent reactors.

The deasphalting step, effected by an extraction with a solvent, which may or may not be hydrocarbon, (for example with paraffins having from 3 to 6 carbon atoms), is generally carried out at temperatures ranging from 40 to 200° C. and at a pressure ranging from 0.1 to 7 MPa. It can also consist of one or more sections operating with the same solvent or with different solvents; the solvent can be recovered under supercritical conditions thus allowing further fractionation between asphalt and resins.

The stream consisting of deasphalted oil (DAO) can be used as such as synthetic crude oil (syncrude), optionally mixed with the distillates, or it can be used as charge for fluid bed Catalytic Cracking treatment or Hydrocracking.

Depending on the characteristics of the crude oil (metal content, content of sulfur and nitrogen, carbonaceous residue), it is possible to advantageously modulate:

the ratio between the heavy residue to be sent to the hydro-treatment section (fresh charge) and that to be sent for deasphalting; said ratio can vary from 0 to 100, preferably from 0.1 to 10, more preferably from 1 to 5;

the recycling ratio between fresh charge and tar to be sent to the deasphalting section; said ratio preferably varies from 0.1 to 100, more preferably from 0.1 to 10;

the recycling ratio between fresh charge and asphalts to be sent to the hydro-treatment section; said ratio can vary in relation to the variation in the previous ratios;

the recycling ratio between tar and asphalts to be sent to the hydro-treatment section; said ratio can vary in relation to the variation in the previous ratios.

This flexibility is particularly useful for better exploiting the complementary characteristics of the deasphalting units (reasonable HDN and dearomatization) and hydrogenation units (high HDM and HDS).

Depending on the type of crude oil, the stability of the streams in question and quality of the product to be obtained (also in relation to the particular downstream treatment), the fractions of fresh charge to be fed to the deasphalting and hydro-treatment sections can be modulated in the best possible way.

Furthermore, to achieve the best possible running of these processes, it is advisable to guarantee compatibility of the streams to be mixed, or that the flows of fresh charge and tar
fresh charge and asphalt (possibly containing resins or an aliquot thereof)
tar and asphalt (possibly containing resins or an aliquot thereof) having different physico-chemical characteristics, are mixed in such ratios as to avoid precipitation of asphaltenes in all process phases.

The process, object of the present invention, can be further improved, as far as the compatibility of the streams to be mixed is concerned, by controlling that the recycling between the streams containing asphaltenes, or fresh charge, tar and asphalt, has such a ratio that:

$$(v_{mix}/RT)(\delta_{asph} - \delta_{mix})^2 < k$$

wherein:

$v_{mix}$ is the molar volume of the maltene component (i.e. non-asphaltene) of the mixture ($cm^3$/mole);

$\delta_{mix}$ is the solubility parameter of the maltene component of the mixture $(cal/cm^3)^{1/2}$;

$\delta_{asph}$ is the solubility parameter of the asphaltenes of the mixture (the highest value among the values of the two components of the mixture is considered)$(cal/cm^3)^{1/2}$;

R=Gas Constant (1.987 cal/mol ° K);

T: temperature expressed in Kelvin degrees.

The asphaltenes used as reference for determining the properties indicated above are the insoluble n-heptane fraction ($C_7$ asphaltenes).

The values indicated in the formula are calculated as follows:

$v_{mix}$=molar average of the molar volumes of the maltene components $\delta_{mix}$=volumetric average of the solubility parameters of the maltene components k=constant whose value ranges from 0.2 to 0.5.

The application described is particularly suitable when the heavy fractions of complex hydrocarbon mixtures produced by the process must be used as charge for catalytic cracking plants, both Hydrocracking (HC) and fluid bed Catalytic Cracking (FCC).

The combined action of a catalytic hydrogenation unit (HT) with an extractive process (SDA), in fact, allows deasphalted oils to be produced with a reduced content of contaminants (metals, sulfur, nitrogen, carbonaceous residue), which can therefore be more easily treated in catalytic cracking processes.

Furthermore, the investment cost of the whole complex can also be minimized as, with respect to the scheme described in patent application IT-95A001095, for the same charge unit treated, the dimensions of the deasphalting section are increased whereas those of the hydro-treatment section (and downstream distillation column) are reduced; as the deasphalting unit involves lower investment costs than the hydro-treatment unit, there is a consequent saving on the investment cost of the whole complex.

A preferred embodiment of the present invention is now provided with the help of FIG. 1 enclosed, which however should not be considered as limiting the scope of the invention itself.

The heavy charge (1), or at least a part thereof (1a), is sent to the deasphalting unit (SDA), an operation which is effected by means of extraction with solvent.

Two streams are obtained from the deasphalting unit (SDA): one (2) consisting of deasphalted oil (DAO), the other consisting of asphalts and resins (3); the latter can be further separated into the two groups of compounds of which it is formed, and the fraction of resins (4) can be divided between DAO and asphalt.

The stream consisting of asphalt and resins (or a fraction of these) is mixed with fresh make-up catalyst (5) necessary for reintegrating that used up with the flushing stream (14), with the part of heavy charge (1b) not fed to the deasphalting section and optionally with the stream (15) (which will be described further on in the text) coming from the bottom of the distillation column (D) to form a stream (6) which is fed to the hydro-treatment reactor (HT) into which hydrogen (or a mixture of hydrogen and $H_2S$) (7), is charged. A stream (8) containing the hydrogenation product and catalyst in dispersed phase, leaves the reactor and is fractionated in a distillation column (D) from which the lighter fractions (9) and distillable products (10), (11) and (12) are separated from the distillation residue containing the dispersed catalyst and coke. This stream, called tar, (13), is completely or for the most part, except for a flushing (14), recycled to the deasphalting reactor (SDA). A part of this (15) can be optionally sent to the hydro-treatment unit (HT).

Some examples are provided below for a better illustration of the invention without limiting its scope.

EXAMPLE 1

Following the scheme represented in FIG. 1, the following experiment was carried out.

Deasphalting Step
  Charge: 300 g vacuum residue from Ural crude oil (Table 1)
  Deasphalting agent: 2000 cc of liquid propane (extraction repeated 3 times)
  Temperature: 80° C.
  Pressure: 35 bars

TABLE 1

Characteristics of Ural vacuum residue 500° $C_{.+}$

| API gravity | 10.8 |
|---|---|
| Sulfur (w %) | 2.6 |
| Nitrogen (w %) | 0.7 |
| CCR (w %) | 18.9 |
| Ni + V (ppm) | 80 + 262 |

Hydro-Treatment Step
  Reactor: 3000 cc, steel, suitably shaped and equipped with magnetic stirring
  Catalyst: 3000 ppm of Mo/charge added using molybdenum naphthenate as precursor
  Temperature: 410° C.
  Pressure: 16 MPa of hydrogen
  Residence time: 4 h
Flash Step
  Effected by means of a laboratory apparatus for liquid evaporation (T=120° C.)
Experimental Results 10 consecutive deasphalting tests were effected using, for each test, a charge consisting of Ural vacuum residue (fresh charge) and atmospheric residue obtained from the hydro-treatment reaction of $C_3$ asphaltenes of the previous step in order to allow the complete recycling of the catalyst added during the first test. At every step, the autoclave was fed with a quantity of charge consisting of Ural vacuum residue (fresh charge) and $C_3$ asphaltenes deriving from the deasphalting, which was such as to bring the total charge mass (fresh charge+recycled $C_3$ asphaltenes) to the initial value of 300 g.

The ratio between quantity of fresh charge and quantity of recycled charge reached under these operating conditions was 1:1.

The data relating to the out-going streams after the last recycling (weight % with respect to the charge) are as follows:
  Gas: 7%
  Naphtha ($C_5$-170° C.): 8%
  Atmospheric gas oil (AGO 170-350° C.): 17%
  Deasphalted oil (VGO+DAO): 68%

The asphaltene stream recovered at the end of the test contains all the catalyst initially fed, sulfides of the metals Ni and V produced during the 10 recycles from the hydro-treatment and a quantity of coke in the order of about 1% by weight with respect to the total quantity of Ural residue fed. In the example indicated, there was no need to effect any flushing of the recycled stream. Table 2 provides the characterization of the product obtained.

TABLE 2 characteristics of test reaction products according to Example 1.

| | Sulfur w % | Nitrogen (ppm) | Sp. Gr. | RCC (w %) | Ni + V (ppm) |
|---|---|---|---|---|---|
| Naphtha $C_5$-170° C. | 0.06 | 450 | 0.768 | — | — |
| AGO 170-350° C. | 0.52 | 2100 | 0.870 | — | — |
| VGO + DAO | 1.45 | 2500 | 0.938 | 3 | 1 |

EXAMPLE 2

An experiment was conducted, similar to the one described in experiment 1, effecting the hydro-treatment step, however, at 420° C.

The ratio between quantity of fresh charge and quantity of recycled product reached under these operating conditions was 1:1.5.

The data relating to the out-going streams after the last recycling (weight % with respect to the charge) are as follows:
  Gas: 9%
  Naphtha ($C_5$-170° C.): 11%
  Atmospheric gas oil (AGO 170-350° C.): 24%
  Deasphalted oil (VGO+DAO): 56%

In the example indicated, there was no need to effect any flushing of the recycled stream.

Table 3 provides the characterization of the product obtained.

TABLE 3 characteristics of test reaction products according to Example 2.

| | Sulfur w % | Nitrogen (ppm) | Sp. Gr. | RCC (w %) | Ni + V (ppm) |
|---|---|---|---|---|---|
| Naphtha $C_5$-170° C. | 0.05 | 300 | 0.759 | — | — |
| AGO 170-350° C. | 0.51 | 2950 | 0.864 | — | — |
| VGO + DAO | 1.45 | 2200 | 0.922 | 2.5 | 1 |

EXAMPLE 3

The following example shows the use of the relation $$(v_{mix}/RT)(\delta_{asph}-\delta_{mix})^2 < k$$

indicated in the present invention to evaluate the compatibility limits of the various streams to be subjected to hydro-treatment.

The streams used in Examples 1 and 2 were characterized to determine the properties used in the above relation.

Starting from the properties indicated in Table 4 and using the above relation, the parameter k values were calculated in all the possible mixture situations of the two streams: from 0% of the first component and 100% of the second component up to the reverse situation, i.e. 100% of the first component and 0% of the second component. The temperature to which reference was made for determining the properties is 140° C.

Figure 2:
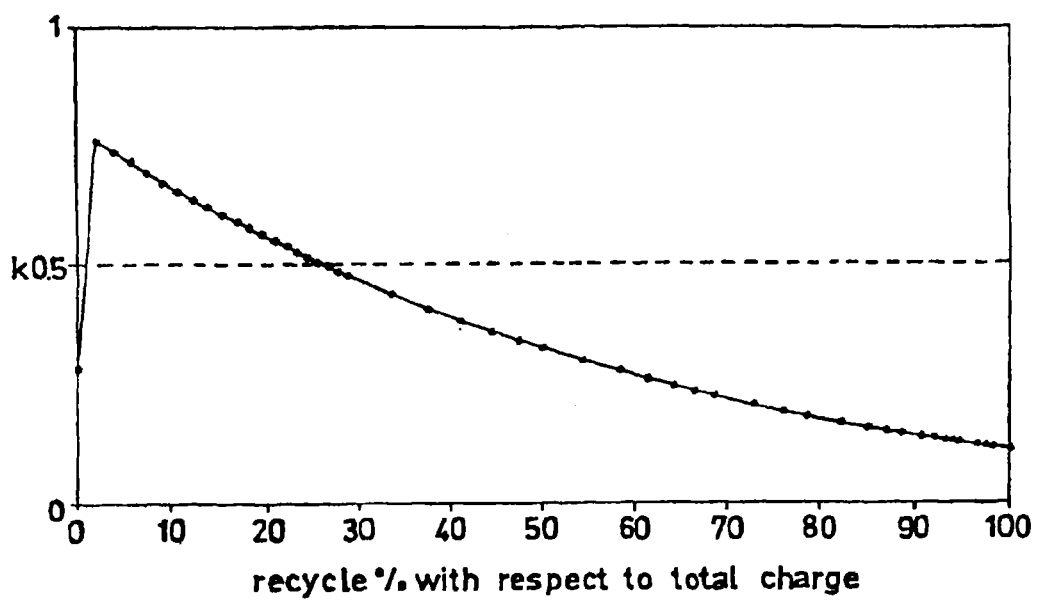
FIG. 2 shows variation of the k parameter in relation to the composition of a mixture.

The values obtained are indicated in the graph of FIG. 2.

TABLE 4

Properties of the streams used in Examples 1 and 2

| PROPERTIES | CHARGE (RV) | RECYCLE |
| --- | --- | --- |
| $\delta$ mix (cal/cm$^3$)$^{1/2}$ | 8.9 | 9.15 |
| $\delta$ asph. (cal/cm$^3$)$^{1/2}$ | 9.2 | 9.4 |
| v mix (cm$^3$/mole) | 1300 | 750 |
| Density @ 15° C. (g/cm$^3$) | 0.912 | 1.11 |
| k | 0.28329 | 0.11350 |

It can be noted from the graph that the two separate streams are stable (k≤0.5), whereas the vacuum residue charge immediately becomes unstable (k values>0.5) with small additions of recycled stream. For recycled stream additions higher than 25%, the mixture becomes stable again (k values≤0.5).

The invention claimed is:

1. A process for the conversion of heavy charges selected from heavy crude oils, distillation residues, "heavy oils coming from catalytic treatment, "thermal tars", tars from oil sands, various kinds of coals and other high-boiling charges of a hydrocarbon origin known as "black oils", by the combined use of the following three process units: hydroconversion with catalysts in slurry phase (HT), distillation or flash (D), deasphalting (SDA), characterized in that the three units operate on mixed streams consisting of fresh charge and recycled streams, with the use of the following steps:
    sending at least one fraction of the heavy charge to a deasphalting section (SDA) in the presence of hydrocarbon solvents obtaining two streams, one consisting of deasphalted oil (DAO), the other of asphalts;
    mixing the asphalt with a suitable hydrogenation catalyst and with the remaining fraction of the heavy charge not sent to the deasphalting section and sending the mixture obtained to a hydro-treatment reactor (HT) into which hydrogen or a mixture of hydrogen and H$_2$S is charged;
    sending the stream containing the hydro-treatment reaction product and the catalyst in dispersed phase to one or more distillation or flash steps (D) whereby the most volatile fractions are separated, among which the gases produced in the hydro-treatment reaction;
    recycling at least 60% by weight of the distillation residue (tar) or liquid leaving the flash unit, containing the catalyst in dispersed phase, rich in metallic sulfides produced by demetallation of the heavy charge, to the deasphalting zone.

2. The process according to claim 1, wherein at least 80% by weight of the distillation residue or liquid leaving the flash unit is recycled to the deasphalting zone.

3. The process according to claim 2, wherein at least 95% by weight of the distillation residue or liquid leaving the flash unit is recycled to the deasphalting zone.

4. The process according to claim 1, wherein at least part of the remaining part of distillation residue (tar) or liquid leaving the flash unit, not recycled to the deasphalting zone, is recycled to the hydrotreatment section.

5. The process according claim 1, wherein the recycling ratio between the streams containing asphaltenes, or fresh charge, tar and asphalts, must be such that:

$$(v_{mix}/RT)(\delta_{asph}-\delta_{mix})^2 < k$$

wherein:
$\delta_{asph}$ is the highest value among the solubility parameters of the two C$_7$ asphaltenes of the mixture (highest value)
$v_{mix}$ is the molar average of the molar volumes of the maltene components
$\delta_{mix}$ is the volumetric average of the solubility parameters of the maltene components
k is a constant whose value ranges from 0.2 to 0.5.

6. The process according to claim 1, wherein the distillation step is carried out at a reduced pressure ranging from 0.001 to 0.5 MPa.

7. The process according to claim 6, wherein the distillation step is carried out at a reduced pressure ranging from 0.05 to 0.3 MPa.

8. The process according to claim 1, wherein the hydro-treatment step is carried out at a temperature ranging from 370 to 450° C. and a pressure ranging from 30 to 300 Atm.

9. The process according to claim 8, wherein the hydro-treatment step is carried out at a temperature ranging from 380 to 440° C. and a pressure ranging from 100 to 200 Atm.

10. The process according to claim 1, wherein the deasphalting step is carried out at temperatures ranging from 40 to 200° C. and a pressure ranging from 1 to 70 Atm.

11. The process according to claim 1, wherein the deasphalting solvent is a light paraffin with from 3 to 6 carbon atoms.

12. The process according to claim 1, wherein the deasphalting step is carried out by means of extraction with a solvent operating in supercritical phase.

13. The process according to claim 1, wherein the stream consisting of deasphalted oil (DAO) is fractionated by conventional distillation.

14. The process according to claim 1, wherein the stream consisting of deasphalted oil (DAO) is mixed with the products separated in the flash step after being condensed.

15. The process according to claim 1, wherein the hydrogenation catalyst is an easily decomposable precursor or a preformed compound based on one or more transition metals.

16. The process according to claim 15, wherein the transition metal is molybdenum.

17. The process according to claim 1, wherein the concentration of catalyst in the hydroconversion reactor, defined on the basis of the concentration of the metal or metals present, ranges from 350 to 10000 ppm.

18. The process according to claim 17, wherein the concentration of catalyst in the hydroconversion reactor ranges from 1000 to 8000 ppm.

19. The process according to claim 18, wherein the concentration of catalyst in the hydroconversion reactor ranges from 1500 to 5000 ppm.

20. The process according to claim 1, wherein the charge subject to a demetallation is coke.

21. A process for the conversion of at least one heavy charge selected from the group consisting of a heavy crude oil, a distillation residue, a heavy oil from catalytic treatment, a thermal tar, a tar from oil sands, a coal and a high-boiling hydrocarbon black oil, with a catalytic slurry phase hydroconversion unit (HT), a distillation and/or flash unit (D), and a deasphalting unit (SDA), comprising:

sending a first portion of the heavy charge to the deasphalting unit (SDA) in the presence of one or more hydrocarbon solvents to form a deasphalted oil stream comprising deasphalted oil (DAO) and an asphalt stream comprising asphalts;

mixing the asphalt stream with a suitable hydrogenation catalyst and a remaining portion of the heavy charge not sent to the deasphalting unit to form a mixture and hydrotreating the mixture in a hydro-treatment reactor in the hydroconversion unit (HT) into which hydrogen or a mixture of hydrogen and $H_2S$ is charged to form a hydrotreated stream;

sending the hydrotreated stream containing the hydrogenation catalyst in a dispersed phase to one or more distillation or flash steps in the distillation and/or flash unit (D) to separate one or more volatile fractions and one or more the gases and form a distillation residue;

recycling at least 60% by weight of a distillation residue leaving the distillation and/or flash unit (D) to the deasphalting unit (SDA), wherein the distillation residue contains the hydrogenation catalyst in a dispersed phase that is rich in metallic sulfides produced by demetallation of the heavy charge.

* * * * *